US011871159B2

(12) United States Patent
Kaneda

(10) Patent No.: US 11,871,159 B2
(45) Date of Patent: Jan. 9, 2024

(54) DISPLAY UNIT FOR REDUCING DEGRADATION OF OPTICAL COMPONENTS

(71) Applicant: SONY CORPORATION, Tokyo (JP)

(72) Inventor: Kazumasa Kaneda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 318 days.

(21) Appl. No.: 17/287,647

(22) PCT Filed: Oct. 17, 2019

(86) PCT No.: PCT/JP2019/040883
§ 371 (c)(1),
(2) Date: Apr. 22, 2021

(87) PCT Pub. No.: WO2020/090498
PCT Pub. Date: May 7, 2020

(65) Prior Publication Data
US 2021/0360210 A1 Nov. 18, 2021

(30) Foreign Application Priority Data
Nov. 2, 2018 (JP) .................................. 2018-207748

(51) Int. Cl.
*H04N 9/31* (2006.01)
*G02B 27/09* (2006.01)
*G02F 1/1335* (2006.01)

(52) U.S. Cl.
CPC ....... *H04N 9/3152* (2013.01); *G02B 27/0961* (2013.01); *G02F 1/133526* (2013.01)

(58) Field of Classification Search
CPC .... H04N 9/315; H04N 9/3141; H04N 9/3152; H04N 9/3167; G03B 21/00;
(Continued)

(56) References Cited

U.S. PATENT DOCUMENTS

2003/0210222 A1* 11/2003 Ogiwara .............. G02B 6/0061
345/103
2003/0214617 A1* 11/2003 Bierhuizen .......... G03B 21/006
353/31
(Continued)

FOREIGN PATENT DOCUMENTS

CN       101086558 A       12/2007
JP       09-218461 A       8/1997
(Continued)

OTHER PUBLICATIONS

International Search Report and Written Opinion of PCT Application No. PCT/JP2019/040883, dated Dec. 24, 2019, 12 pages of ISRWO.

*Primary Examiner* — Sultan Chowdhury
(74) *Attorney, Agent, or Firm* — CHIP LAW GROUP

(57) ABSTRACT

A display unit of the present disclosure includes: a light source section that outputs light; a light uniformization section including at least one uniformization optical member and having a light entrance surface through which the light outputted from the light source section enters and a light output surface through which light is outputted; a condenser lens for the light outputted from the light uniformization section to enter; and a reflective light valve to be illuminated by light outputted from the condenser lens. A light condensing position for return light that is reflected by the light valve and returns to the light output surface of the light uniformization section via the condenser lens is configured to be located off a light condensing position of the light uniformization section on a light output surface side for the light outputted from the light source section.

11 Claims, 15 Drawing Sheets

(58) Field of Classification Search
CPC ...... G03B 21/008; G03B 21/14; G03B 21/28; G03B 21/145; G03B 21/206; G03B 21/2013; G03B 21/2033; G03B 21/2053; G03B 21/2066; G02B 27/0961; G02B 27/0966; G02B 27/0977; G02B 27/1026; G02F 1/133526; G02F 1/133528; G02F 1/133536; G02F 1/133553

See application file for complete search history.

(56) References Cited

U.S. PATENT DOCUMENTS

| | | |
|---|---|---|
| 2004/0075816 A1 | 4/2004 | Seo |
| 2007/0058134 A1* | 3/2007 | Kodama ............... G02B 27/145 353/20 |
| 2007/0291594 A1 | 12/2007 | Okuyama et al. |
| 2011/0096298 A1* | 4/2011 | Huang ................ G03B 21/208 353/31 |
| 2011/0194076 A1 | 8/2011 | Seo et al. |
| 2011/0279742 A1 | 11/2011 | Endo |
| 2012/0236218 A1 | 9/2012 | Haruyama |
| 2016/0196005 A1* | 7/2016 | Kaneda ................ H04N 9/3197 353/20 |
| 2019/0132499 A1* | 5/2019 | Yasui ................... H04N 9/3155 |

FOREIGN PATENT DOCUMENTS

| | | |
|---|---|---|
| JP | 10-054958 A | 2/1998 |
| JP | 10-288756 A | 10/1998 |
| JP | 2003-287808 A | 10/2003 |
| JP | 2004-191688 A | 7/2004 |
| JP | 2008-015501 A | 1/2008 |
| JP | 2011-164611 A | 8/2011 |
| JP | 2011-237710 A | 11/2011 |
| JP | 2012-189930 A | 10/2012 |
| JP | 2013-213896 A | 10/2013 |
| JP | 2015-022294 A | 2/2015 |
| KR | 10-2004-0020333 A | 3/2004 |
| KR | 10-2007-0117496 A | 12/2007 |
| KR | 10-2011-0091360 A | 8/2011 |
| TW | 201137502 A | 11/2011 |

\* cited by examiner

[FIG. 1]
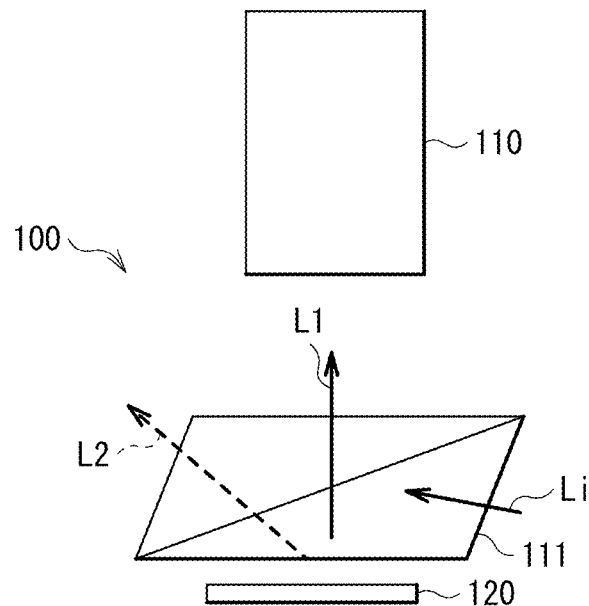
[FIG. 2]
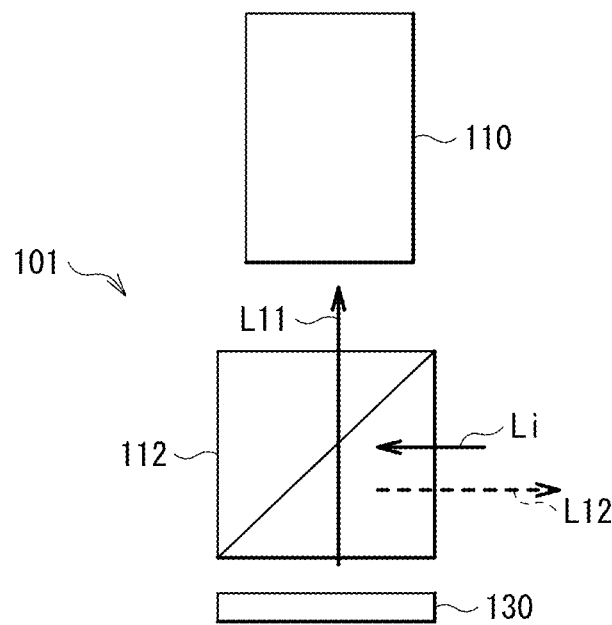

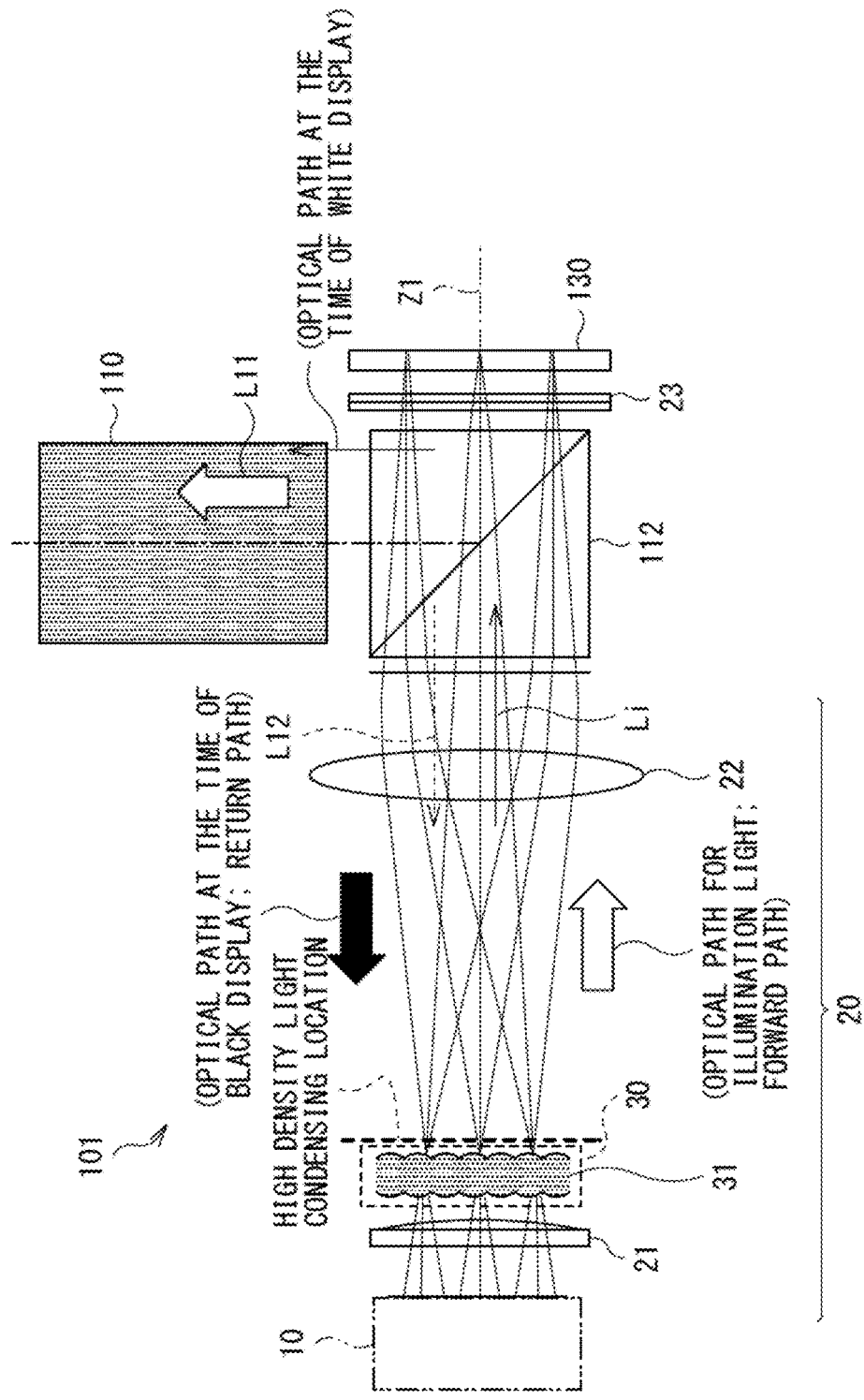

[FIG. 4]
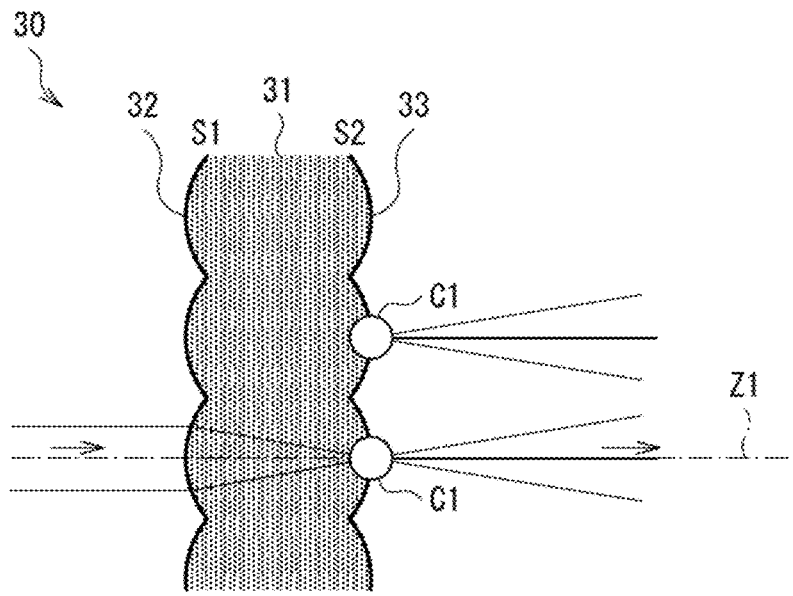
[FIG. 5]
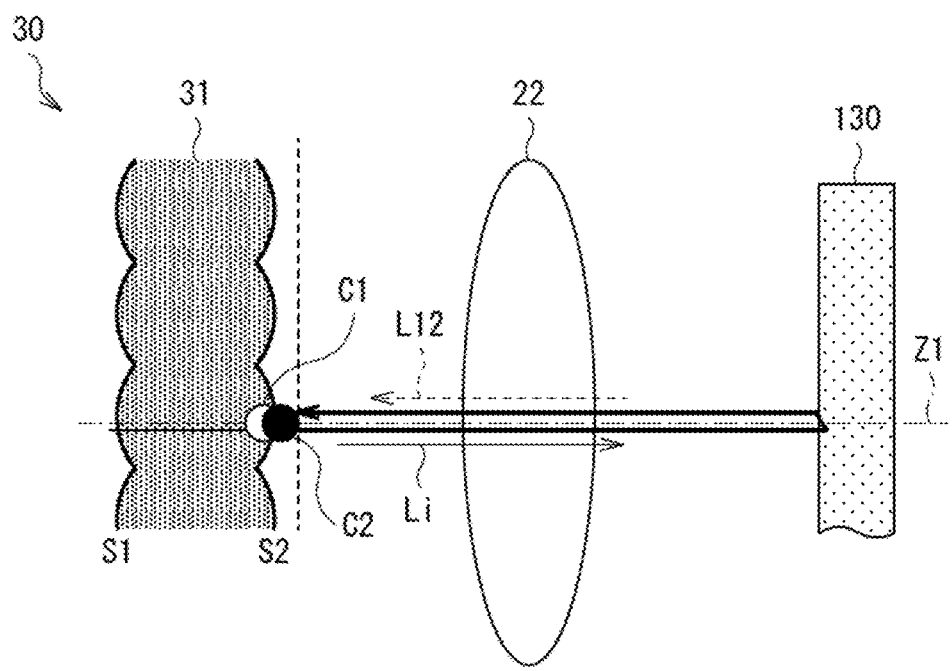

[FIG. 6]
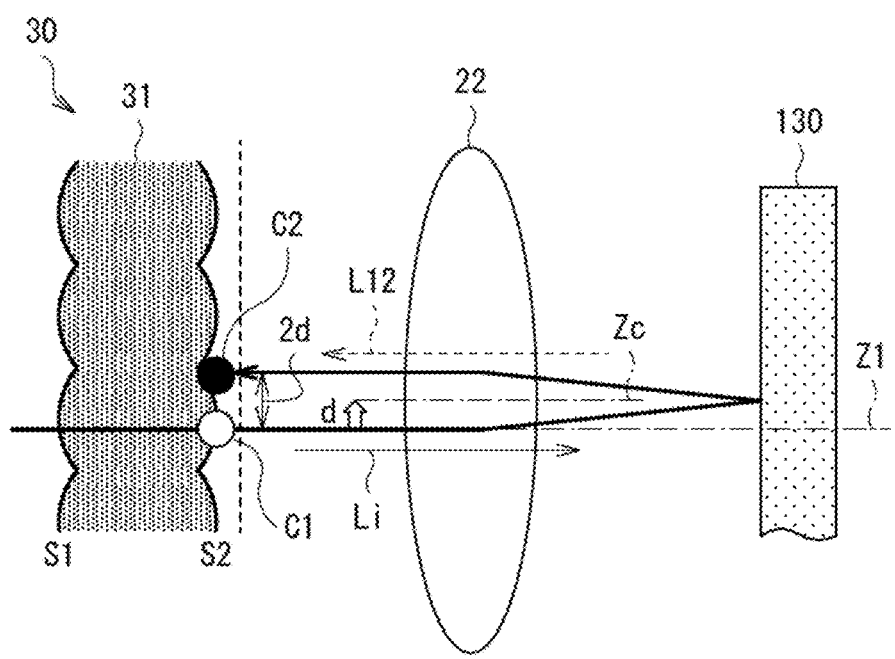

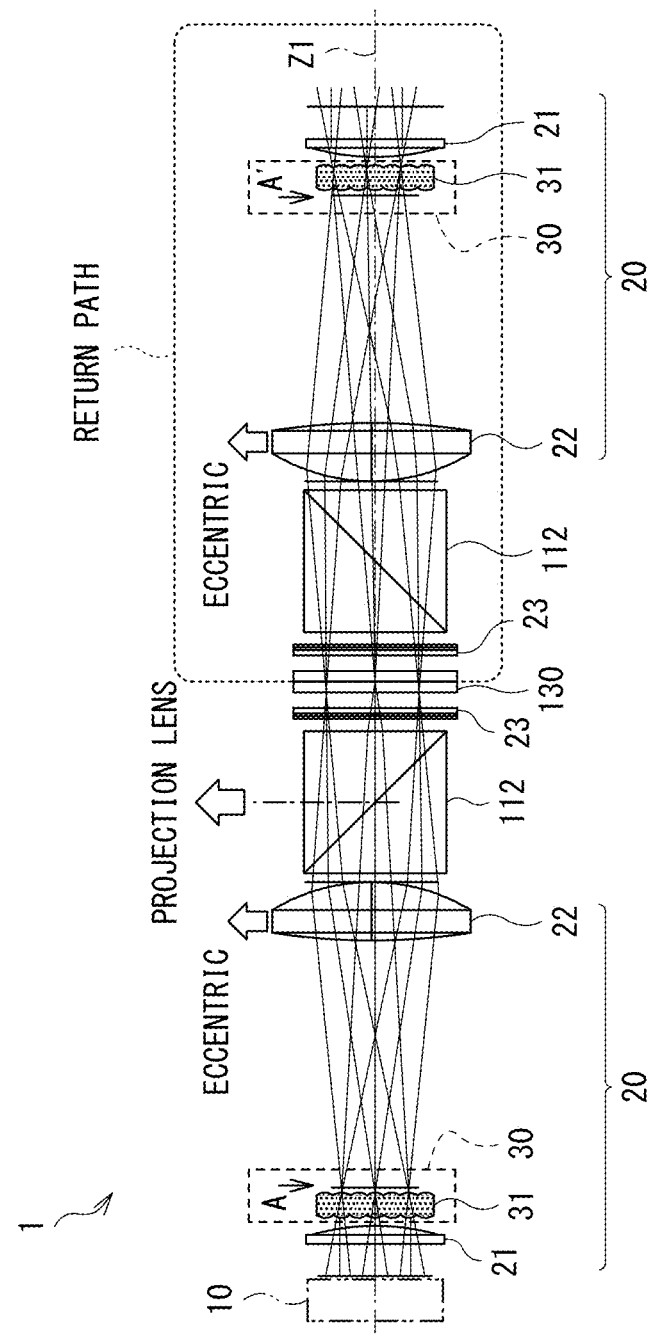
[FIG. 7]

[FIG. 8]
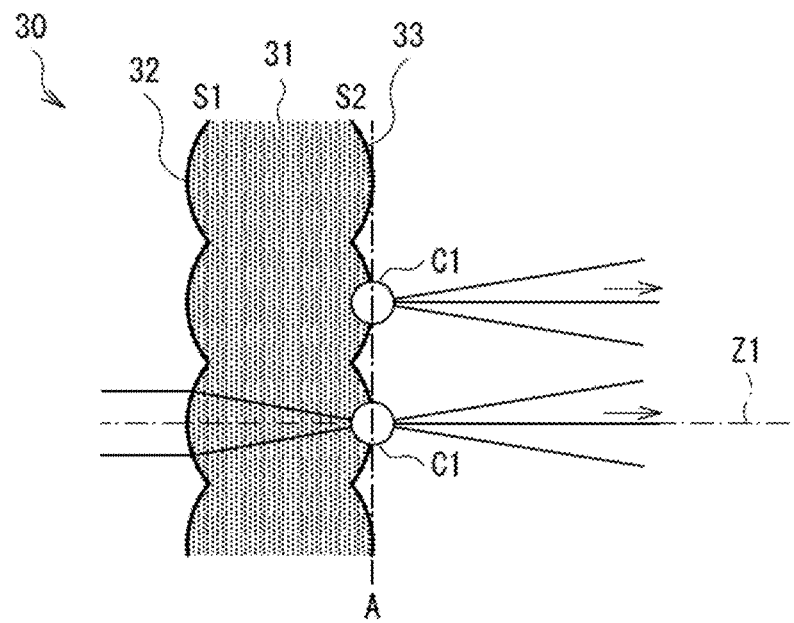
FORWARD PATH
[FIG. 9]
COMPARATIVE EXAMPLE
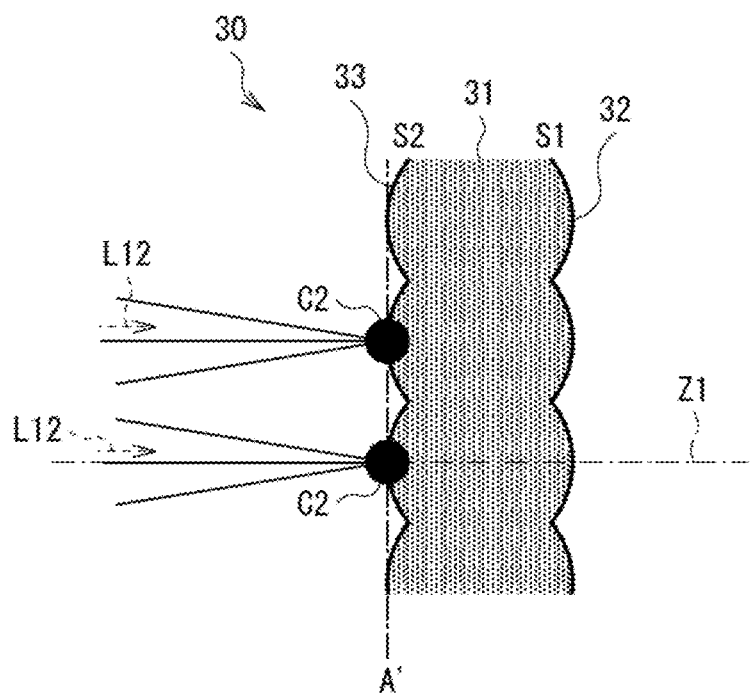
RETURN PATH

[FIG. 10]
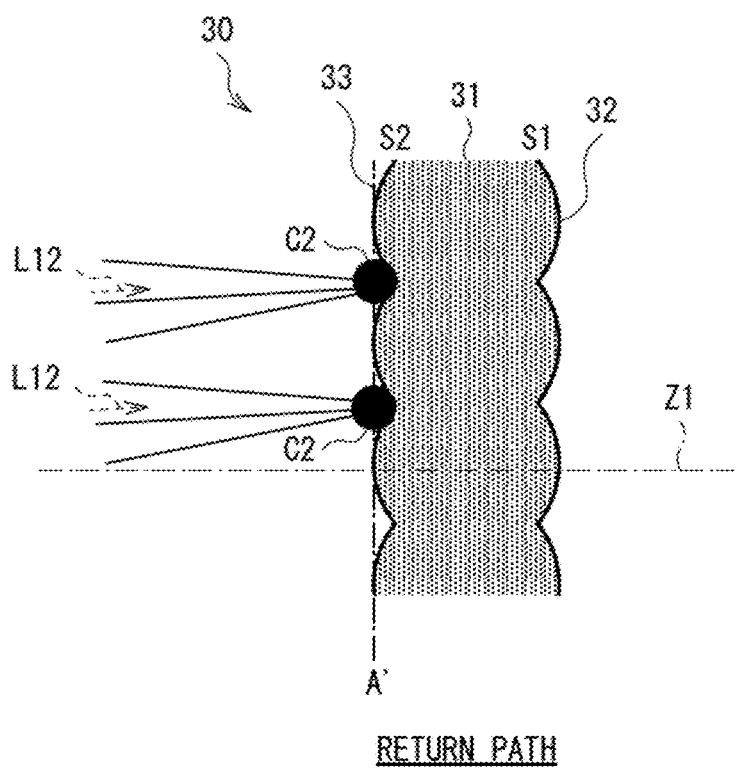
RETURN PATH

[FIG. 11]
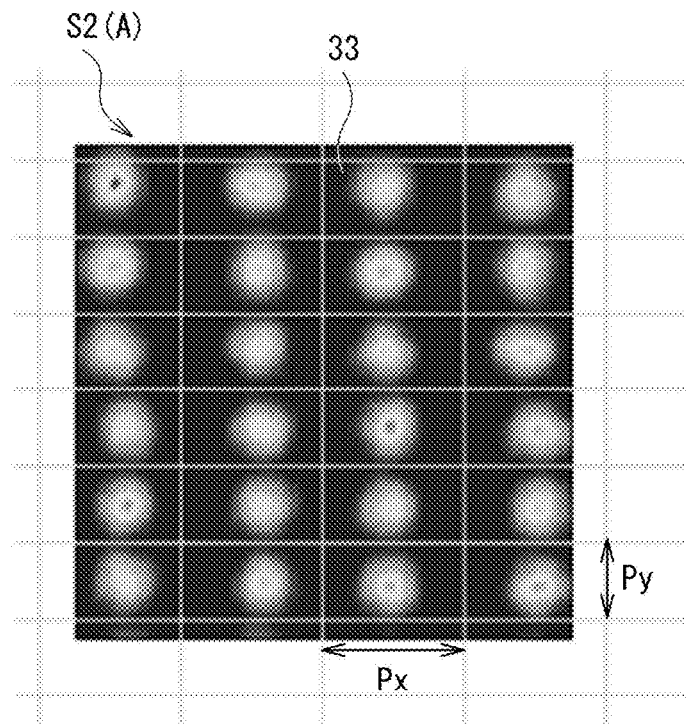
[FIG. 12]
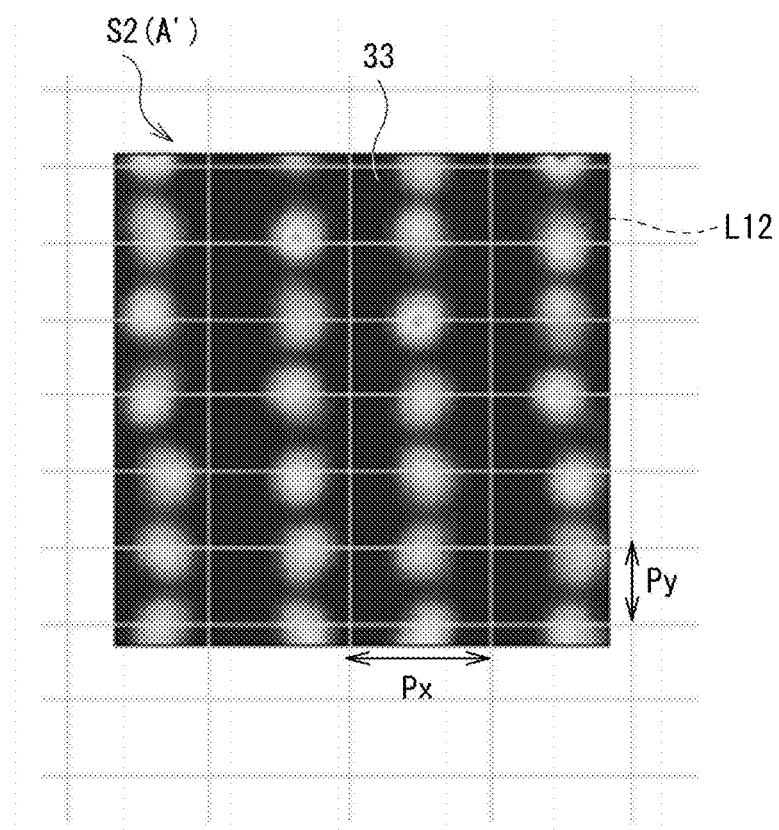

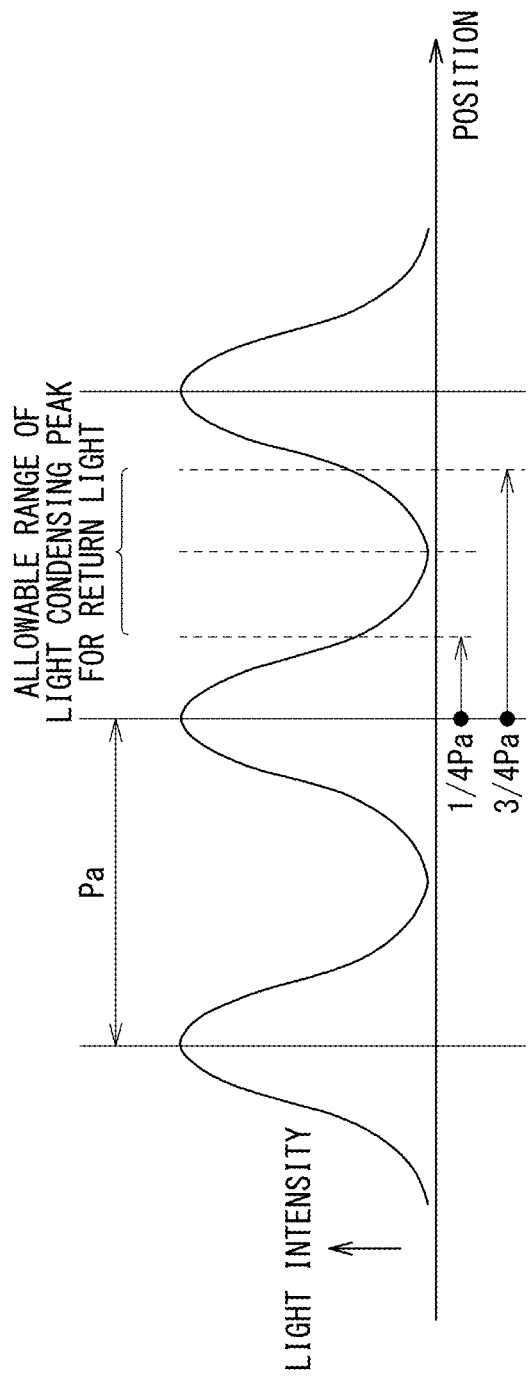
[FIG. 13]

[FIG. 14]
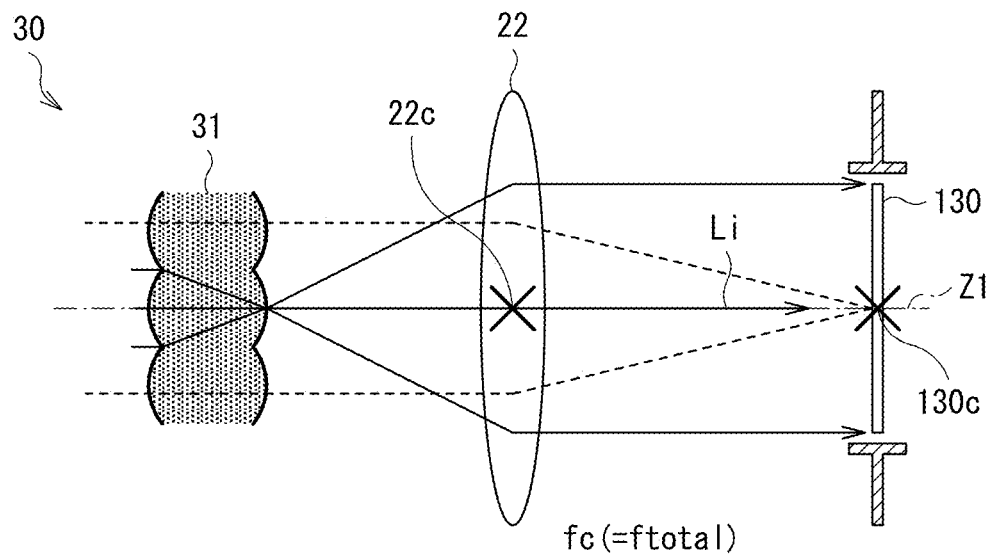
[FIG. 15]
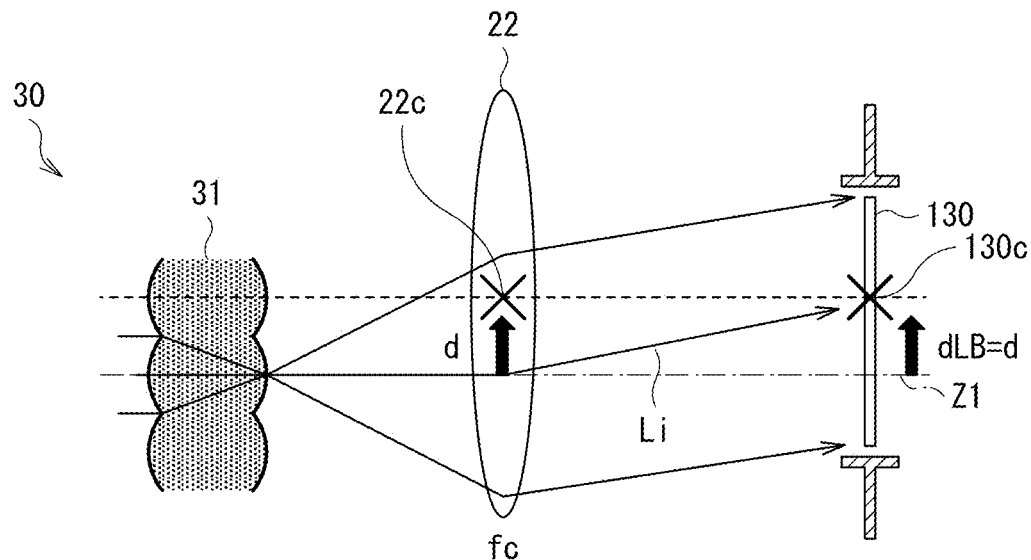

[FIG. 16]
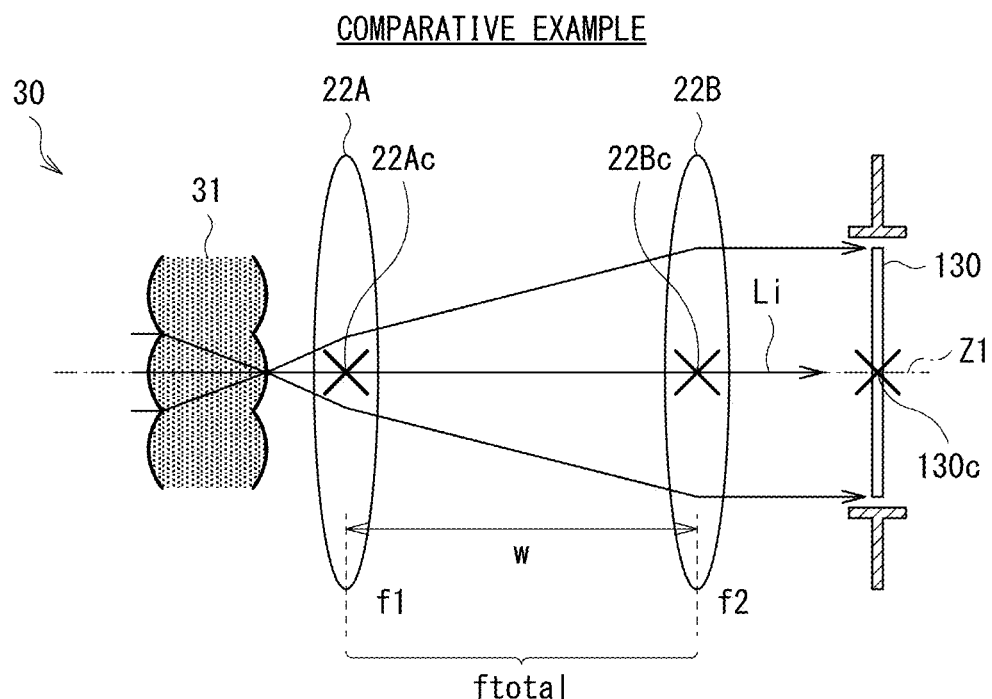
[FIG. 17]
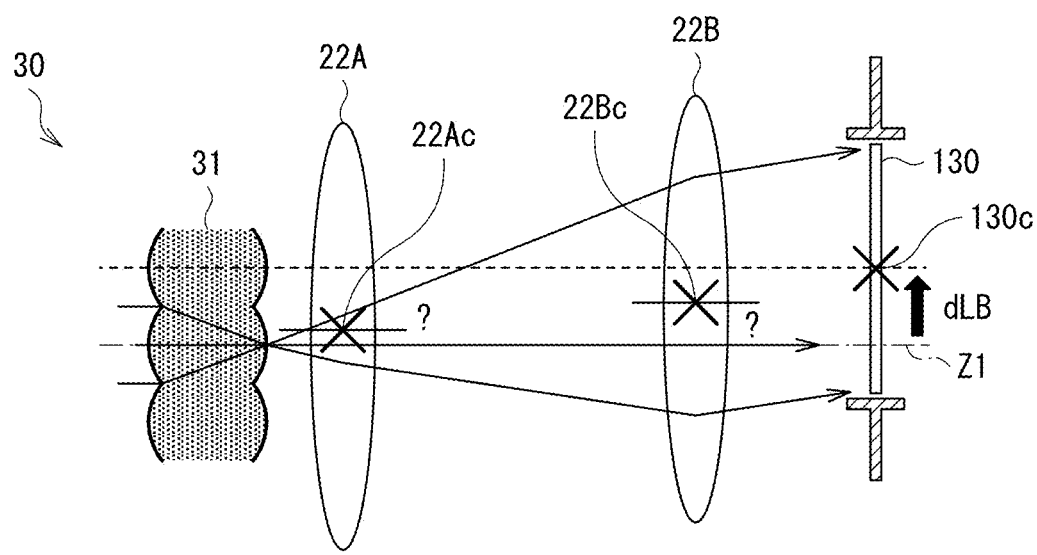

[FIG. 18]
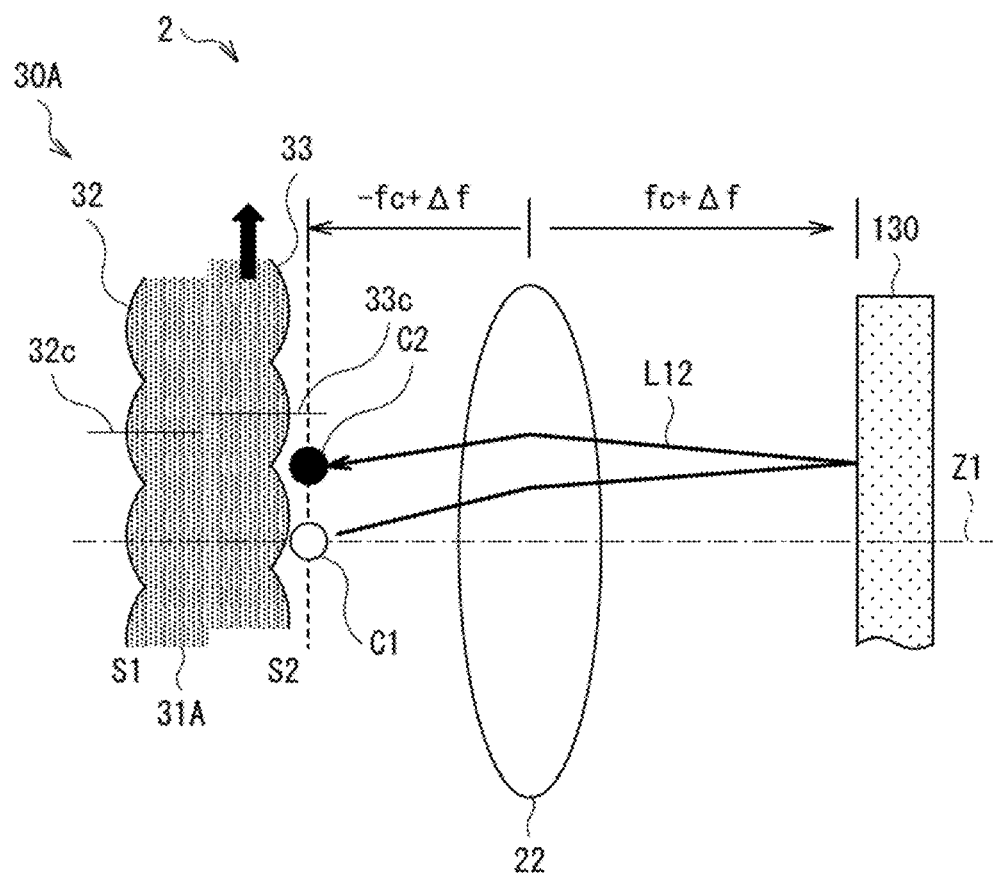

[FIG. 19]
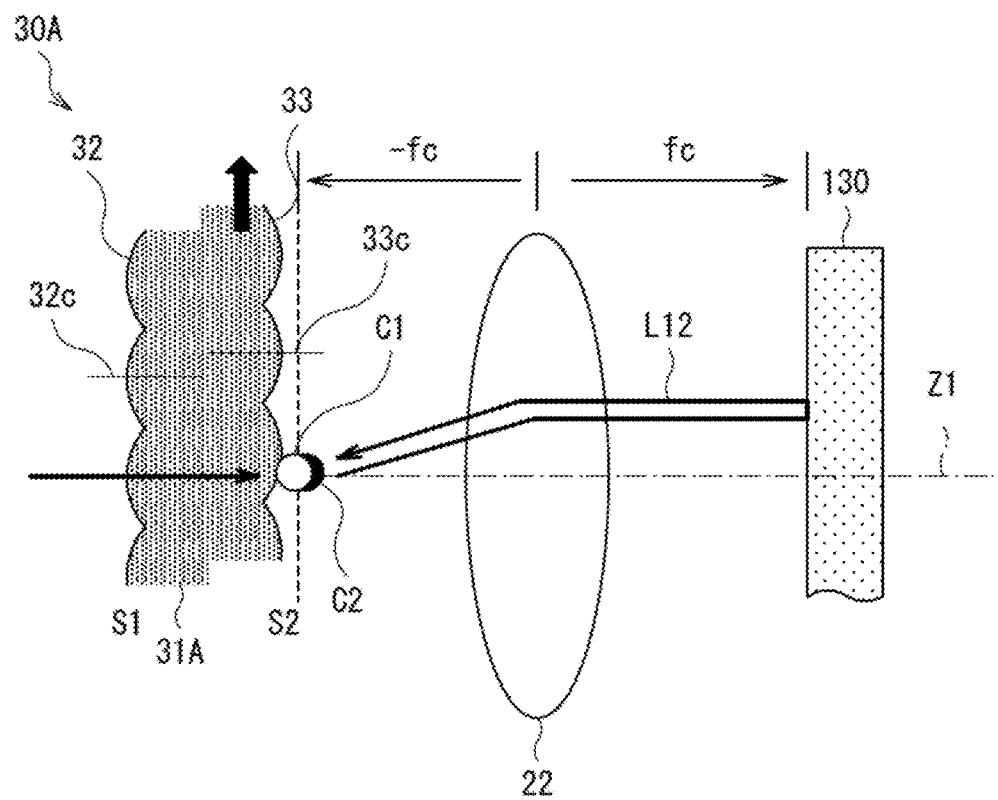

[FIG. 20]
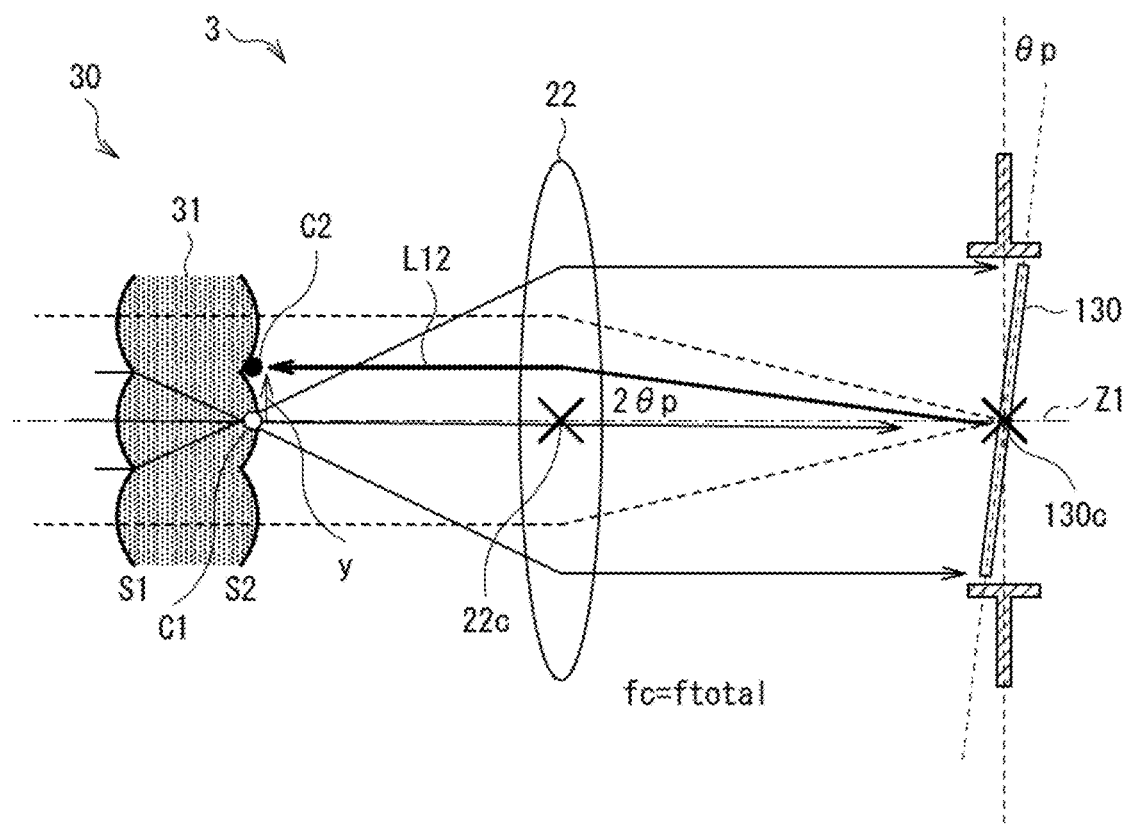

[FIG. 21]
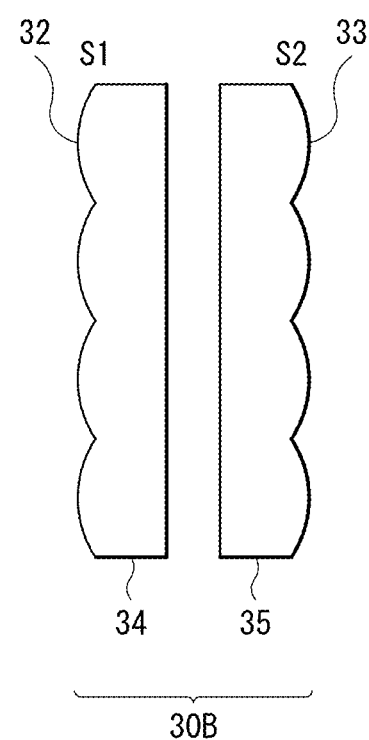

DISPLAY UNIT FOR REDUCING DEGRADATION OF OPTICAL COMPONENTS

CROSS REFERENCE TO RELATED APPLICATIONS

This application is a U.S. National Phase of International Patent Application No. PCT/JP2019/040883 filed on Oct. 17, 2019, which claims priority benefit of Japanese Patent Application No. JP 2018-207748 filed in the Japan Patent Office on Nov. 2, 2018. Each of the above-referenced applications is hereby incorporated herein by reference in its entirety.

TECHNICAL FIELD

The present disclosure relates to a display unit that uses a reflective light valve.

BACKGROUND ART

As a display unit, there is a projector using a light modulator (a light valve). The projector generates a projection image by modulating illumination light from an illumination optical system by using the light valve, and projects the projection image onto a screen or the like. Types of the projector include one that uses a transmissive light valve and one that uses a reflective light valve. As the reflective light valve, for example, a reflective liquid crystal display device is used (see PTL 1).

CITATION LIST

Patent Literature

PTL 1: Japanese Unexamined Patent Application Publication No. 2013-213896

SUMMARY OF THE INVENTION

Regarding the projector using the reflective liquid crystal display device, there is a concern that, for example, light reflected by the reflective liquid crystal display device at the time of a black display can become return light to enter the illumination optical system again, thus degrading optical components in the illumination optical system.

It is desirable to provide a display unit that is able to reduce degradation of the optical components for illumination.

A display unit according to an embodiment of the present disclosure includes: a light source section that outputs light; a light uniformization section including at least one uniformization optical member and having a light entrance surface through which the light outputted from the light source section enters and a light output surface through which light is outputted; a condenser lens for the light outputted from the light uniformization section to enter; and a reflective light valve to be illuminated by light outputted from the condenser lens. A light condensing position for return light that is reflected by the light valve and returns to the light output surface of the light uniformization section via the condenser lens is configured to be located off a light condensing position of the light uniformization section on a light output surface side for the light outputted from the light source section.

In the display unit according to the embodiment of the disclosure, the light condensing position for the return light that is reflected by the light valve and returns to the light output surface of the light uniformization section via the condenser lens is located off the light condensing position of the light uniformization section on the light output surface side for the light outputted from the light source section.

BRIEF DESCRIPTION OF DRAWING

FIG. 1 is a cross-sectional diagram schematically illustrating an example of a main part configuration of a projector of a DLP type, which is an example of a display unit according to a comparative example. DLP type FIG. 2 is a cross-sectional diagram schematically illustrating an example of a main part configuration of a projector of a reflective liquid crystal type, which is an example of a display unit according to a comparative example.

FIG. 3 is a cross-sectional diagram illustrating an example of an overall configuration of the projector the reflective liquid crystal type, which is an example of the display unit according to the comparative example.

FIG. 4 is an explanatory diagram illustrating a configuration example of a uniformization optical member in the display unit according to the comparative example, and also illustrating an example of a light condensing position of the uniformization optical member on a light output surface side.

FIG. 5 is an explanatory diagram illustrating an example of the light condensing position of the uniformization optical member on the light output surface side and a light condensing position for return light returning to the light output surface of the uniformization optical member in the display unit according to the comparative example.

FIG. 6 is an explanatory diagram illustrating the light condensing position of the uniformization optical member on the light output surface side and the light condensing position for the return light returning to the light output surface of the uniformization optical member in a case where a condenser lens is made eccentric.

FIG. 7 is a cross-sectional diagram schematically illustrating a configuration example of a display unit according to a first embodiment of the present disclosure.

FIG. 8 is an explanatory diagram illustrating an example of the light condensing position of the uniformization optical member on the light output surface side in the display unit according to the first embodiment.

FIG. 9 is an explanatory diagram illustrating an example of the light condensing position for the return light returning to the light output surface of the uniformization optical member in a display unit according to a comparative example.

FIG. 10 is an explanatory diagram illustrating an example of the light condensing position for the return light returning to the light output surface of the uniformization optical member in the display unit according to the first embodiment.

FIG. 11 is an explanatory diagram illustrating an example of a light condensing density of light from a light source section in the vicinity of the light output surface of the uniformization optical member in the display unit according to the first embodiment.

FIG. 12 is an explanatory diagram illustrating an example of the light condensing density of the return light in the vicinity of the light output surface of the uniformization optical member in the display unit according to the first embodiment.

FIG. 13 is an explanatory diagram illustrating an example of a relationship between a position in the light output surface of the uniformization optical member and a light intensity of the light from the light source section in the display unit according to the first embodiment.

FIG. 14 is an explanatory diagram illustrating, in a state where a single condenser lens is provided and the condenser lens is not eccentric, an example of relationships between an optical axis of the uniformization optical member, an optical axis of the condenser lens, and a center point of a reflective liquid crystal display device with respect to an optical axis of an entire illumination optical system.

FIG. 15 is an explanatory diagram illustrating, in a state where a single condenser lens is provided and the condenser lens is eccentric, an example of relationships between the optical axis of the uniformization optical member, the optical axis of the condenser lens, and the center point of the reflective liquid crystal display device with respect to the optical axis of the entire illumination optical system.

FIG. 16 is an explanatory diagram illustrating, in a state where two condenser lenses are provided and the condenser lenses are not eccentric, an example of relationships between the optical axis of the uniformization optical member, optical axes of the condenser lenses, and the center point of the reflective liquid crystal display device with respect to the optical axis of the entire illumination optical system.

FIG. 17 is an explanatory diagram illustrating, in a state where two condenser lenses are provided and the condenser lenses are eccentric, an example of relationships between the optical axis of the uniformization optical member, the optical axes of the condenser lenses, and the center point of the reflective liquid crystal display device with respect to the optical axis of the entire illumination optical system.

FIG. 18 is a cross-sectional diagram schematically illustrating an example of a main part configuration of a display unit according to a second embodiment.

FIG. 19 is a cross-sectional diagram schematically illustrating an example of a main part configuration of a projector of a comparative example with respect to the display unit according to the second embodiment.

FIG. 20 is a cross-sectional diagram schematically illustrating an example of a main part configuration of a display unit according to a third embodiment.

FIG. 21 is a cross-sectional diagram schematically illustrating a modification example of the light uniformization section.

MODES FOR CARRYING OUT THE INVENTION

Embodiments of the present disclosure are described below in detail with reference to the drawings. Note that the description will be given in the following order.
1. First Embodiment (an example in which a condenser lens is made eccentric) (FIGS. 1 to 17)
  1.0. Comparative Example
  1.1. Configuration and Workings of a Display Unit According to the First Embodiment
  1.2. Effects
2. Second Embodiment (an example in which a light entrance surface and a light output surface of a light uniformization section are made eccentric) (FIGS. 18 and 19)
3. Third Embodiment (an example in which a reflective liquid crystal display device is inclined) (FIG. 20)
4. Other Embodiments (FIG. 21)

1. First Embodiment

1.0. Comparative Example

Summary and Problem of Display Unit According to Comparative Example

Existing small-size projectors that are widely on the market typically use a mirror-reflective DLP (Digital Light Processing) (registered trademark) type for their image display devices (light valves).

FIG. 1 schematically illustrates an example of a main part configuration of a projector 100 of a DLP type, which is an example of a display unit according to a comparative example.

The projector 100 of the DLP type includes a projection lens 110 as a projection optical system, a TIR (Total Internal Reflection) prism 111, and a micromirror array device 120 as the light valve.

The micromirror array device 120 is, for example, a mirror array device including a plurality of mirrors. The micromirror array device 120 is configured by, for example, a DMD (Digital Micromirror Device) or the like in which a plurality of micromirrors corresponding to pixels is arranged in an array (matrix). The micromirror array device 120 generates projection light L1 (a projection image) by modulating illumination light Li from an unillustrated illumination optical system on the basis of an image signal. The micromirror array device 120 changes a tilt angle of each mirror on the basis of the image signal, and thereby causes, at the time of a white display, the illumination light Li to be deflected via the TIR prism 111 toward the projection lens 110.

In contrast, in a case where an image to be projected is dark (at the time of a black display), a mirror angle of the micromirror array device 120 is adjusted to thereby deflect the illumination light Li in a direction off the projection lens 110 (illumination light L2 in FIG. 1). In this case, a method of extinguishing energy by radiating the illumination light L2 toward an inner wall of a projector body is typically adopted. However, the illumination light L2 caused to irradiate the inner wall is reflected and diffused at the inner wall, and it is therefore difficult to completely extinguish the light. Therefore, a phenomenon occurs in which part of the diffused light becomes leakage light and leaks from the projection lens 110 to the outside of the projector, thereby degrading contrast. An image created with low luminance for a dark part and with high luminance for a bright area is perceived by humans as a high-quality image. Thus, parameters of the contrast that influence the performance are very important. It can be said that the DLP type projector 100 that is not able to sufficiently exert the contrast performance has plenty of room for improvement in performance as a projector.

Accordingly, in order to pursue an image display of higher quality, there is a projector of a type using a polarization optical system rather than the DLP type. Regarding the projectors of the type using the polarization optical system, for example, a type using a liquid crystal display device for the light valve is known.

FIG. 2 schematically illustrates an example of a main part configuration of a projector 101 of a reflective liquid crystal type, which is an example of a display unit according to a comparative example.

The projector 101 of the reflective liquid crystal type includes a projection lens 110 as a projection optical system, a polarization beam splitter 112, and a reflective liquid crystal display device 130 as a light valve.

The reflective liquid crystal display device 130 is illuminated with illumination light Li of a predetermined polarization component from an unillustrated illumination optical system via the polarization beam splitter 112. The reflective liquid crystal display device 130 generates projection light L11 (a projection image) by modulating the illumination light Li on the basis of an image signal. The reflective liquid crystal display device 130 changes a polarization direction of the illumination light Li on the basis of the image signal. At the time of the white display, the reflective liquid crystal display device 130 changes the polarization direction of the illumination light Li for transmission through the polarization beam splitter 112. As a result, the projection light L11 transmitted through the polarization beam splitter 112 is projected by the projection lens 110 onto a projection surface such as an unillustrated screen.

In contrast, in the case where the image to be projected is dark (at the time of the black display), the reflective liquid crystal display device 130 does not change the polarization direction of the illumination light Li. As a result, the illumination light Li is reflected again by the polarization beam splitter 112 to become return light L12 returning to the illumination optical system.

In the projector 101 of the reflective liquid crystal type, the polarization beam splitter 112 is very high in blocking polarization performance, and is therefore able to almost completely block light of a polarization component orthogonal to the polarization component to be transmitted. This makes it possible to keep leakage light toward the projection lens 110 very low, and therefore makes it possible to provide an image of high contrast and high quality. Therefore, as an optimum optical system for the projector to provide a high quality image, a configuration using the liquid crystal display device and the polarization optical system is desirable.

However, there is a problem specific to adopting the reflective liquid crystal type. The problem is the processing of the return light L12 and an influence thereof. At the time of the black display, the light does not undergo rotation of the polarization direction at the reflective liquid crystal display device 130 and returns to the original illumination optical system as it is through the polarization beam splitter 112 again. Thus, the light passes through an optical component on an optical path in the illumination optical system twice. In this case, a first path is a path leading from an unillustrated light source to the reflective liquid crystal display device 130 via the illumination optical system, and a second path is a path through which the light returns toward the light source via the illumination optical system again when the polarization direction is not rotated by the reflective liquid crystal display device 130. Therefore, particularly in a portion of the illumination optical system having a high light condensing density on the first path, there is an issue that the light condensing density is further doubled on the second path under the influence of the return light L12.

The above-described issue has been avoided by introducing a glass optical component into a portion that is unable to maintain light resistance with a resin lens. This has resulted in an issue that a high cost is inevitable. In addition, in the case of a glass component, a complicated structure that is formable by a resin lens is not achievable due to processing constraints of a mold or the like. Therefore, there have been optical parameters that are difficult to implement in manufacturing.

FIG. 3 illustrates an example of an overall configuration of the projector 101 of the reflective liquid crystal type, which is an example of the display unit according to the comparative example.

The projector 101 includes a light source section 10 that outputs light to be a source of the illumination light Li, and an illumination optical system 20 that generates the illumination light Li on the basis of the light outputted from the light source section 10. Further, an optical member 23 is disposed between the reflective liquid crystal display device 130 and the polarization beam splitter 112. The optical member 23 is, for example, a quarter-wave plate, and improves a contrast characteristic by adjusting a phase difference.

The light source section 10 includes, for example, a solid-state light-emitting device or a discharge tube lamp. The solid-state light emitting device may be, for example, a laser diode or an LED (Light Emitting Diode). The discharge tube lamp may be, for example, a high-pressure mercury lamp or a xenon lamp.

The illumination optical system 20 includes an illumination lens 21, a light uniformization section 30, and a condenser lens 22 in order in which the light outputted from the light source section 10 enters.

Light outputted from the light uniformization section 30 enters the condenser lens 22. The condenser lens 22 condenses the light outputted from the light uniformization section 30 as the illumination light Li toward the reflective liquid crystal display device 130 via the polarization beam splitter 112.

The light uniformization section 30 includes at least one uniformization optical member.

FIG. 4 illustrates a configuration example of the uniformization optical member, and also an example of a light condensing position of the uniformization optical member on a light output surface side.

The uniformization optical member includes, for example, a microlens array 31 with a plurality of microlenses 32 and 33 arranged in a grid shape on both surfaces. In the microlens array 31, the plurality of microlenses 32 is arranged on a light entrance surface S1 through which the light outputted from the light source section 10 enters. In the microlens array 31, the plurality of microlenses 33 is arranged on a light output surface S2 through which light is outputted toward the condenser lens 22.

The light outputted from the light source section 10 is condensed into a greatly high light density on the light output surface S2 of the microlens array 31 in the illumination optical system 20, as illustrated as a light condensing position C1 in FIG. 4, for example. The light condensing position C1 is, for example, located in the vicinity of an apex position of each of the plurality of microlenses 33 provided on the light output surface S2.

As described above, in the projector 101 of the reflective liquid crystal type, the return light L12 returning to the illumination optical system 20 is present at the time of the black display.

FIG. 5 illustrates an example of a path of the return light L12 at the time of the black display. In FIG. 5, an example of the light condensing position C1 of the uniformization optical member (the microlens array 31) on the light output surface S2 side and a light condensing position C2 for the return light L12 returning to the light output surface S2 in the projector 101 is illustrated.

As illustrated in FIG. 5, in the illumination optical system 20, the light condensing position C1 on a forward path for the light outputted from the light source section 10 and the light condensing position C2 on a return path for the light (the return light L12) returning from the reflective liquid crystal display device 130 to the light output surface S2 substantially coincide with each other.

In FIG. 5, an optical path of light passing through an optical axis Z1 of the entire illumination optical system 20 is illustrated as an example. On the optical axis Z1, a main light beam passing through an apex of the microlens array 31 passes through a middle of the condenser lens 22 and reaches the reflective liquid crystal display device 130. In the case of the black display, the main light beam returns to the condenser lens 22 at the same angle, and again reaches the light condensing position C2 in the vicinity of the light output surface S2 of the microlens array 31. In a case where the light condensing position C1 on the forward path of the light and the light condensing position C2 on the return path completely overlap each other, it follows that the light density is doubled if optical attenuation or the like in each optical device through which the light passes is ignored. Therefore, the light density becomes very high locally at the light condensing positions C1 and C2. Because the microlens array 31 is very short in focal length, the light condensing positions C1 and C2 on the light output surface S2 side are very close to the microlens array 31. As a result, degradation as a lens tends to occur.

1.1. Configuration and Workings of Display Unit According to First Embodiment To address the problems described above, in the technology of the present disclosure, the light condensing position C2 for the return light L12 that is reflected by the reflective liquid crystal display device 130 and returns to the light output surface S2 of the microlens array 31 via the condenser lens 22 is configured to be located off the light condensing position C1 of the microlens array 31 on the light output surface S2 side for the light outputted from the light source section 10. Degradation of the optical components is thereby reduced.

As illustrated in FIG. 6, by making the condenser lens 22 eccentric with respect to the state illustrated in FIG. 5 described above, it is possible to change the light condensing position C2 for the return light L12. FIG. 6 illustrates an example of the light condensing position C1 of the uniformization optical member (the microlens array 31) on the light output surface S2 side and the light condensing position C2 for the return light L12 returning to the light output surface S2 in a case where the condenser lens 22 is made eccentric.

In FIG. 6, an optical path of light passing through the optical axis Z1 of the entire illumination optical system 20 in the microlens array 31 is illustrated as an example. On the optical axis Z1, because of the condenser lens 22 being eccentric, the main light beam passing through the apex of the microlens array 31 is refracted by the condenser lens 22 and reaches the reflective liquid crystal display device 130 in an angled state (in a state of being shifted from the optical axis Z1). In the case of the black display, the main light beam returns to the condenser lens 22 in an angled state and is refracted again by the condenser lens 22, reaching the light condensing position C2 in the vicinity of the light output surface S2 of the microlens array 31. In the comparative example in FIG. 5, light is allowed to travel in a state where telecentricity is maintained in the illumination optical system 20, whereas in FIG. 6, light travels in a state where the telecentricity is disturbed. By virtue of the condenser lens 2 being eccentric, it becomes possible for light to travel through optical paths that are different between when traveling forward and when traveling backward, and accordingly, it becomes possible to make the light condensing position C1 on the forward path of the light and the light condensing position C2 on the backward path different from each other. FIG. 6 illustrates an example in which an optical axis Zc of the condenser lens 22 is made eccentric with respect to the optical axis Z1 of the entire illumination optical system 20 by an eccentricity amount d. In this case, the light condensing position C2 for the light on the return path (the return light L12) returning to the light output surface S2 from the reflective liquid crystal display device 130 shifts by 2$d$ with respect to the light condensing position C1 on the forward path of the light outputted from the light source section 10.

FIG. 7 schematically illustrates a configuration example of a projector 1 of the reflective liquid crystal type, which is an example of a display unit according to a first embodiment of the present disclosure.

The projector 1 may have a configuration substantially similar to that of the projector 101 (FIGS. 2 to 5) according to the comparative example described above, except that the condenser lens 22 is made eccentric with respect to the optical axis Z1. In the following, components substantially the same as those of the projector 101 according to the comparative example are denoted by the same reference signs, and the description thereof is omitted where appropriate.

In FIG. 7, for convenience of explanation, two paths of light are illustrated in a manner in which they are developed coaxially (on the optical axis Z1) with the reflective liquid crystal display device 130 as a plane of symmetry. A first path is a path through which, at the time of the white display and at the time of the black display, the light is guided from the light source section 10 to the reflective liquid crystal display device 130 via the illumination optical system 20 (the forward path). A second path is a path of the return light L12 that is, at the time of the black display, reflected by the reflective liquid crystal display device 130 and returns to the light source section 10 via the illumination optical system 20 again (the return path). In FIG. 7, a portion surrounded by broken lines indicates the return path, and the other portion indicates the forward path.

FIG. 8 illustrates an example of the light condensing position C1 of the microlens array 31 on the light output surface S2 side in the projector 1. FIG. 9 illustrates an example of the light condensing position C2 for the return light L12 returning to the light output surface S2 of the microlens array 31 in the projector 101 of the comparative example. FIG. 10 illustrates an example of the light condensing position C2 for the return light L12 returning to the light output surface S2 of the microlens array 31 in the projector 1.

On the forward path illustrated in FIG. 7, a light condensing position A in the vicinity of the light output surface S2 of the microlens array 31 corresponds to the light condensing position C1 in FIG. 8, and is very high in light density. Further, on the return path illustrated in FIG. 7, a light condensing position A' in the vicinity of the light output surface S2 of the microlens array 31 corresponds to the light condensing position C2 in FIGS. 9 and 10, and is very high in light density.

In the projector 1, because of the condenser lens 22 being eccentric, a light beam having entered the condenser lens 22 enters the reflective liquid crystal display device 130 in a skewed state. At the time of the black display, the light reflected by the reflective liquid crystal display device 130 passes through the same condenser lens 22 again and returns to the light output surface S2 of the microlens array 31. At this time, without the eccentricity of the condenser lens 22, the light condensing positions C1 and C2 at the light condensing position A and the light condensing position A' (which is originally at the same location as the light condensing position A spatially) would overlap each other; however, by making the condenser lens 22 eccentric to thereby disturb the telecentricity of the illumination optical system 20, it is possible to shift the light condensing position A' (the light condensing position C2) from the apex of the microlens array 31.

FIG. 11 illustrates an example of a light condensing density of the light from the light source section 10 (the light condensing density on the forward path) in the vicinity of the light output surface S2 (the light condensing position A) of the microlens array 31 in the projector 1. FIG. 12 illustrates an example of the light condensing density of the return light L12 (the light condensing density on the return path) in the vicinity of the light output surface S2 (the light condensing position A') of the microlens array 31 in the projector 1.

In FIGS. 11 and 12, Px represents an array pitch in a horizontal direction of the microlens array 31. Py represents an array pitch in a vertical direction of the microlens array 31. On the light output surface S2 of the microlens array 31, a plurality of microlenses 33 is provided in a rectangular shape in a plan view.

As illustrated in FIG. 11, on the forward path, for example, the light condensing density increases at a middle portion (in the vicinity of a lens apex) of each of the plurality of microlenses 33. On the return path, as illustrated in FIG. 12, the light condensing density of the return light L12 increases just in the vicinity of a border (an intermediate region) between every two of the plurality of microlenses 33. In the projector 1, because the condenser lens 22 is made eccentric, the light condensing positions for the light are different between the forward path and the return path. This makes it possible to avoid the occurrence of addition of the light condensing density and to thereby make the light condensing density lower than has been achievable.

Note that it suffices that the light condensing position C2 on the light output surface S2 side for the return light L12 is configured to be located off the light condensing position C1 on the light output surface S2 side on the forward path in any of the horizontal direction (a side-to-side direction in FIG. 12), the vertical direction (an up-and-down direction in FIG. 12), and a diagonally oblique direction. Therefore, a direction of eccentricity of the condenser lens 22 may be any of the horizontal direction, the vertical direction, and the diagonally oblique direction. In FIG. 12, the condenser lens 22 is made eccentric in a direction of the shorter side for the aspect ratio (the vertical direction in FIG. 12); however, a similar effect is expectable from other directions.

FIG. 13 illustrates an example of a relationship between a position in the light output surface S2 of the microlens array 31 and a light intensity of the light from the light source section 10 in the projector 1 according to the first embodiment. The distribution of light intensities in FIG. 13 corresponds to the distribution of light condensing densities in FIG. 11.

It is preferable that the light condensing position C2 on the light output surface S2 side for the return light L12 be shifted with respect to the condensing position C1 on the light output surface S2 side on the forward path by a half of an array pitch Pa (a half pitch). Actually, however, it is possible to avoid a pronounced overlapping of the light condensing densities on the forward path and the return path if the light condensing position C2 is shifted to some extent within an allowable range.

For example, as illustrated in FIG. 13, it suffices that the light condensing position C2 for the return light L12 is shifted with respect to the light condensing position C1 on the forward path within an allowable range of ¼ to ¾ of the array pitch Pa. The following will describe conditions that enable the light condensing position C2 for the return light L12 to be shifted by (¼) Pa to (¾) Pa.

(Case of a Single Condenser Lens 22)

In a case where the condenser lens 22 is a single condenser lens, it is possible to allow the light condensing position C2 for the return light L12 to fall within the allowable range illustrated in FIG. 13 described above if an eccentricity amount d of the single condenser lens 22 satisfies the following expression. Further, with respect to the eccentricity amount d of the single condenser lens 22, the light condensing position C2 for the return light L12 shifts by $2d$.

$$0.5 \times (n+0.25)Pa < d < 0.5 \times (n+0.75)Pa \qquad (1)$$

where d is the eccentricity amount of the single condenser lens 22 with respect to the optical axis Z1, Pa is a period of the array pitch of the microlens array 31, and n is an integer.

It is to be noted that the optical axis Z1 is an optical axis of the entire illumination optical system 20 defined by a straight line connecting the lens apex of the illumination lens 21 and a normal of the reflective liquid crystal display device 130.

FIG. 14 illustrates an example of relationships between the optical axis of the microlens 31, the optical axis of the condenser lens 22 (a center point 22c), and a center point 130c of the reflective liquid crystal display device 130 with respect to the optical axis Z1 of the entire illumination optical system 20 in a state where the condenser lens 22 is a single condenser lens and the condenser lens 22 is not eccentric. Further, FIG. 15 illustrates an example of relationships between the optical axis of the microlens 31, the optical axis of the condenser lens 22 (the center point 22c), and the center point 130c of the reflective liquid crystal display device 130 with respect to the optical axis Z1 of the entire illumination optical system 20 in a state where the condenser lens 22 is a single condenser lens and the condenser lens 22 is eccentric.

When in the state where the condenser lens 22 is not eccentric, telecentricity is maintained in the illumination optical system 20 and, as illustrated in FIG. 14, the optical axis (the center point 22c) of the condenser lens 22 and the center point 130c of the reflective liquid crystal display device 130 are on the optical axis Z1 of the entire illumination optical system 20.

In the case where the condenser lens 22 is made eccentric to thereby disturb the telecentricity in the illumination optical system 20, as illustrated in FIG. 15, it is preferable that the reflective liquid crystal display device 130 (an area to be illuminated) be also shifted in accordance with the eccentricity amount d of the condenser lens 22. In the case of a single condenser lens 22, a shift amount dLB of the reflective liquid crystal display device 130 is preferably allowed to coincide with a shift amount d of the single condenser lens 22 because an illumination center and the center point 130c of the reflective liquid crystal display device 130 are to be aligned with each other basically in accordance with the shifted illumination region.

(Case of Two or More Condenser Lenses 22)

In a case where the number of the condenser lenses 22 is two or more, it is possible to allow the light condensing position C2 for the return light L12 to fall within the allowable range illustrated in FIG. 13 described above by disposing at least one of the two or more condenser lenses 22 in an eccentric state with respect to the optical axis Z1, also disposing the reflective liquid crystal display device 130 in an eccentric state with respect to the optical axis Z1, and causing an eccentricity amount dLB of the center point 130c of the reflective liquid crystal display device 130 to satisfy the following expression.

$$0.5 \times (n+0.25)Pa < dLB < 0.5 \times (n+0.75)Pa \qquad (2)$$

where
  dLB is the eccentricity amount of the center point 130c of the reflective liquid crystal display device 130 with respect to the optical axis Z1,
  Pa is the period of the array pitch of the microlens array 31, and
  n is an integer.

It is to be noted that the optical axis Z1 is the optical axis of the entire illumination optical system 20 defined by the straight line connecting the lens apex of the illumination lens 21 and the normal of the reflective liquid crystal display device 130.

FIGS. 16 and 17 each illustrate a configuration example in which the condenser lens 22 is configured by two condenser lenses or first and second condenser lenses 22A and 22B. FIG. 16 illustrates an example of relationships between the optical axis of the microlens array 31, optical axes (center points 22Ac and 22Bc) of the first and second condenser lenses 22A and 22B, and the center point 130c of the reflective liquid crystal display device 130 with respect to the optical axis Z1 of the entire illumination optical system 20 in a state where the first and second condenser lenses 22A and 22B are not eccentric. FIG. 17 illustrates an example of relationships between the optical axis of the microlens array 31, the optical axes (the center points 22Ac and 22Bc) of the first and second condenser lenses 22A and 22B, and the center point 130c of the reflective liquid crystal display device 130 with respect to the optical axis Z1 of the entire illumination optical system 20 in a state where the first and second condenser lenses 22A and 22B are eccentric.

When in the state where the condenser lenses 22A and 22B are not eccentric, telecentricity is maintained in the illumination optical system 20 and, as illustrated in FIG. 16, the optical axes (the center points 22Ac and 22Bc) of the first and second condenser lenses 22A and 22B and the center point 130c of the reflective liquid crystal display device 130 are on the optical axis Z1 of the entire illumination optical system 20.

In the case where the condenser lens 22 is configured by two condenser lenses or the first and second condenser lenses 22A and 22B, as illustrated in FIG. 17, it is possible to disturb the telecentricity of the illumination optical system 20 by making one or two of the first and second condenser lenses 22A and 22B eccentric. In the case of making the first and second condenser lenses 22A and 22B eccentric, it is possible to change power balance by arrangement of the lenses. In this case, although it is possible to uniquely define the individual eccentricity amounts of the first and second condenser lenses 22A and 22B, it is difficult to define the individual eccentricity amounts of the first and second condenser lenses 22A and 22B and the eccentricity amount of the reflective liquid crystal display device 130 in a one-to-one relationship.

However, even in the case where the condenser lens 22 is configured by two condenser lenses or the first and second condenser lenses 22A and 22B, using a composite focal length ftotal (converted into a single lens equivalent) of the first and second condenser lenses 22A and 22B allows for representation as an optical system equivalent to that in the case where the condenser lens 22 is configured by a single condenser lens (FIGS. 14 and 15). In that case, fc=ftotal.

As an illumination state of a light beam, the case of FIG. 15 and the case of FIG. 17 result in the same state. Therefore, although it is not possible to define the eccentricity amount of each of the first and second condenser lenses 22A and 22B, it is possible to define the conditions as in the above expression (2) because the eccentricity amount dLB of the reflective liquid crystal display device 130=d.

It is to be noted that the composite focal length ftotal of the first and second condenser lenses 22A and 22B is obtainable by the following expression.

$$1/ftotal = 1/f1 + 1/f2 - w/(f1 \times f2)$$

where
  f1 is a focal length of the first condenser lens 22A,
  f2 is a focal length of the second condenser lens 22B, and
  w is a lens-to-lens distance between the first and second condenser lenses 22A and 22B.

It is to be noted that while the above description has dealt with a case of configuring the condenser lens 22 by two condenser lenses or the first and second condenser lenses 22A and 22B as an example, similar conditions apply to a case of configuring the condenser lens 22 by three or more condenser lenses.

1.2. Effects

As described above, according to the display unit of the first embodiment, the light condensing position C2 for the return light L12 returning to the light output surface S2 of the light uniformization section 30 is located off the light condensing position C1 of the light uniformization section 30 on the light output surface S2 side for the light outputted from the light source section 10. This makes it possible to reduce the light condensing density in the light uniformization section 30, thus making it possible to reduce degradation of the optical components.

It is to be noted that the effects described in this specification are merely illustrative and non-limiting. In addition, there may be any other effect. This also holds true for the effects of the following other embodiments.

2. Second Embodiment

Next, a display unit according to a second embodiment of the present disclosure will be described. It is to be noted that in the following, components substantially the same as those of the display unit according to the first embodiment described above are denoted by the same reference signs, and the description thereof is omitted where appropriate.

FIG. 18 schematically illustrates an example of a main part configuration of a projector 2 of the reflective liquid crystal type, which is an example of the display unit according to the second embodiment. FIG. 19 schematically illustrates an example of a main part configuration of a projector of a comparative example with respect to the display unit according to the second embodiment.

The projector 2 includes a light uniformization section 30A in place of the light uniformization section 30 in the projector 1 according to the first embodiment. The light uniformization section 30A includes a microlens array 30A in place of the microlens array 30 in the light uniformization section 30.

The microlens array 30A has a configuration in which an optical axis 32c of the plurality of microlenses 32 provided on the light entrance surface S1 and an optical axis 33c of the plurality of microlenses 33 provided on the light output surface S2 are eccentric with respect to each other. Further, the light condensing position C1 of the light uniformization section 30A on the light output surface S2 side is configured to be located at a different position from a focal position of the condenser lens 22.

In the first embodiment, as illustrated in FIG. 6, for example, the light condensing position C2 for the return light L12 is shifted with respect to the light condensing position C1 by making the condenser lens 22 eccentric. A similar shifting effect is obtainable by, as illustrated in FIG. 18, making the optical axes 32c and 33c of the microlenses 32 and 33 provided on both surfaces of the microlens array 31A eccentric with respect to each other.

It is to be noted that as illustrated in a comparative example of FIG. 19, making the optical axes 32c and 33c of the microlenses 32 and 33 provided on both surfaces of the microlens array 31A eccentric with respect to each other causes a main light beam passing through the microlens array 31A to be refracted at the light output surface S2; however, in a case where the focal position of the condenser lens 22 is caused to substantially coincide with the light output surface S2 of the microlens array 31A, the light condensing position C2 for the return light L12 falls at the same location as the light condensing position C1 on the forward path. Thus, simply making the optical axes 32c and 33c of the microlenses 32 and 33 provided on both surfaces of the microlens array 31A eccentric with respect to each other is unable to provide effects similar to those obtained in the case where the condenser lens 22 is made eccentric.

To cope with this, as illustrated in FIG. 18, the optical axes 32c and 33c of the microlenses 32 and 33 provided on both surfaces of the microlens array 31A are made eccentric with respect to each other, and also telecentricity of the condenser lens 22 is disturbed to dispose the microlens array 31A at a position shifted by Δf from the focal position of the condenser lens 22. This allows the light condensing position C2 for the return light L12 reflected back from the reflective liquid crystal display device 130 to be shifted with respect to the light condensing position C1 on the forward path, thus making it possible to obtain effects similar to those obtained in the case where the condenser lens 22 is made eccentric.

The other configurations, operations, and effects may be substantially similar to those of the display unit according to the first embodiment described above.

3. Third Embodiment

Next, a display unit according to a third embodiment of the present disclosure will be described. It is to be noted that in the following, components substantially the same as those of the display unit according to the first or second embodiment described above are denoted by the same reference signs, and the description thereof is omitted where appropriate.

FIG. 20 schematically illustrates an example of a main part configuration of a projector 3 of the reflective liquid crystal type, which is an example of the display unit according to the third embodiment.

In the first embodiment, as illustrated in FIG. 6, for example, the light condensing position C2 for the return light L12 is shifted with respect to the light condensing position C1 by making the condenser lens 22 eccentric. A similar shifting effect is obtainable by, as illustrated in FIG. 20, disposing the reflective liquid crystal display device 130 to be inclined with respect to the optical axes of the light uniformization section 30 and the condenser lens 22. In this case, it is preferable that an inclination angle of the reflective liquid crystal display device 130 satisfy the following expression.

$$(½)\arctan[(n+0.25)Pa/fc] < \theta p < (½)\arctan[(n+0.75)Pa/fc] \quad (A)$$

where
$\theta p$ is the inclination angle of the reflective liquid crystal display device 130,
fc is a focal length of the condenser lens 22,
Pa is the period of the array pitch of the microlens array 31, and
n is an integer.

The above expression (A) is determined as follows. As illustrated in FIG. 20, the inclination angle of the reflective liquid crystal display device 130 is denoted as $\theta p$. In a case where light parallel to the optical axis Z1 enters the reflective liquid crystal display device 130, the return light L12 is to be at an angle of $2\theta p$.

From a relationship below:

$$\tan(2\theta p) = y/fc \quad (3),$$

a y coordinate of the light condensing position C2 for the return light L12 on the microlens array 31 is expressible as follows:

$$y = fc \times \tan(2\theta p) \quad (4).$$

The allowable range of the light condensing position C2 for the return light L12 is, as illustrated in FIG. 13, a range from ¼ (=0.25) to ¾ (=0.75) of the array pitch Pa. If a conditional expression is determined to allow y to be an integer multiple of this allowable range of 0.25 Pa to 0.75 Pa, then:

$$(n+0.25)Pa < y < (n+0.75)Pa \quad (5).$$

Substituting expression (4) into expression (5) yields the following expression:

$$(n+0.25)Pa/fc < \tan(2\theta p) < (n+0.75)Pa/fc \quad (6).$$

From expression (6), the following expression is obtained:

$$\arctan[(n+0.25)Pa/fc] < 2\theta p < \arctan[((n+0.75)Pa)/fc] \quad (7)$$

Therefore, it is preferable that the inclination angle $\theta p$ of the reflective liquid crystal display device 130 satisfy the following expression:

$$(½)\arctan[(n+0.25)Pa/fc] < \theta p < (½)\arctan[(n+0.75)Pa/fc] \quad (A).$$

The other configurations, operations, and effects may be substantially similar to those of the display unit according to the first embodiment described above.

4. Other Embodiments

The technology according to the present disclosure is not limited to the description of the embodiments given above, and may be modified in a variety of ways.

In each of the above-described embodiments, a description has been given of an example in which the light uniformization section is configured by a single uniformization optical member (the microlens array) with the plurality of microlenses provided on both surfaces; however, the light uniformization section may include a plurality of uniformization optical members. For example, as illustrated in FIG. 21, a configuration including a light uniformization section 30B that includes a first uniformization optical member 34 and a second uniformization optical member 35 is possible. The first uniformization optical member 34 and the second uniformization optical member 35 are each provided with a plurality of microlenses on one surface thereof only. In this case, another surface of the first uniformization optical member 34 and another surface of the second uniformization optical member 35 may be configured as flat surfaces, and these respective other surfaces may be arranged to be opposed to each other. In this case, the surface of the first uniformization optical member 34 on which the microlenses 32 are provided serves as the light entrance surface S1 of the light uniformization section 30B. Further, the surface of the second uniformization optical member 35 on which the microlenses 33 are provided serves as the light output surface S2 of the light uniformization section 30B.

For example, the present technology may also have any of the following configurations.

According to the present technology having any of the following configurations, it is possible to reduce degradation of the optical components for illumination because the light condensing position for the return light returning to the light output surface of the light uniformization section via the condenser lens is located off the light condensing position of the light uniformization section on the light output surface side for the light outputted from the light source section.

(1)
A display unit including:
  a light source section that outputs light;
  a light uniformization section including at least one uniformization optical member and having a light entrance surface through which the light outputted from the light source section enters and a light output surface through which light is outputted;
  a condenser lens for the light outputted from the light uniformization section to enter; and
  a reflective light valve to be illuminated by light outputted from the condenser lens, in which
  a light condensing position for return light that is reflected by the light valve and returns to the light output surface of the light uniformization section via the condenser lens is configured to be located off a light condensing position of the light uniformization section on a light output surface side for the light outputted from the light source section.

(2)
The display unit according to (1), further including an illumination lens disposed between the light source section and the light uniformization section, in which
  a lens apex of the condenser lens is located at a position different from a position on an optical axis defined by a straight line connecting a lens apex of the illumination lens and a normal of the light valve.

(3)
The display unit according to (2), in which
  the uniformization optical member includes a microlens array in which a plurality of microlenses is arranged, the single condenser lens is disposed between the light uniformization section and the light valve in an eccentric state with respect to the optical axis, and
  an eccentricity amount of the single condenser lens satisfies an expression below:

$$0.5 \times (n+0.25)Pa < d < 0.5 \times (n+0.75)Pa \quad (1)$$

where
  d is the eccentricity amount of the single condenser lens with respect to the optical axis,
  Pa is a period of an array pitch of the microlens array, and
  n is an integer.

(4)
The display unit according to (2), in which
  two or more of the condenser lenses are disposed between the light uniformization section and the light valve in an eccentric state with respect to the optical axis, and the light valve is disposed in an eccentric state with respect to the optical axis, and
  an eccentricity amount of a center point of the light valve satisfies an expression below:

$$0.5 \times (n+0.25)Pa < dLB < 0.5 \times (n+0.75)Pa \quad (2)$$

where
  dLB is the eccentricity amount of the center point of the light valve with respect to the optical axis,
  Pa is a period of an array pitch of the microlens array, and
  n is an integer.

(5)
The display unit according to (1), in which
  in the light uniformization section, the light entrance surface and the light output surface are configured to be eccentric with respect to each other, and
  the light condensing position of the light uniformization section on the light output surface side is located at a position different from a focal position of the condenser lens.

(6)
The display unit according to any one of (1) to (5), in which the light source section includes a solid-state light-emitting device or a discharge tube lamp.

(7)
The display unit according to any one of (1) to (6), in which the uniformization optical member includes a microlens array in which a plurality of microlenses is arranged in a grid shape.

(8)
The display unit according to any one of (1) to (7), in which the light condensing position for the return light is configured to be located off the light condensing position of the light uniformization section on the light output surface side in any of a horizontal direction, a vertical direction, and a diagonally oblique direction.

(9)
The display unit according to any one of (1) and (6) to (8), in which
  the uniformization optical member includes a microlens array in which a plurality of microlenses is arranged,
  the light valve is disposed to be inclined with respect to optical axes of the light uniformization section and the condenser lens, and
  an inclination angle of the light valve satisfies an expression below:
satisfying the following expression.

$$(1/2)\arctan[(n+0.25)Pa/fc] < \theta p < (1/2)\arctan[(n+0.75)Pa/fc] \quad (A)$$

where
- θp is the inclination angle of the light valve,
- fc is a focal length of the condenser lens,
- Pa is a period of an array pitch of the microlens array, and
- n is an integer.

(10) The display unit according to any one of (1) to (9), further including a projection optical system that projects a projection image generated by the light valve onto a projection surface.

This application claims the benefits of Japanese Priority Patent Application No. 2018-207748 filed with the Japan Patent Office on Nov. 2, 2018, the entire contents of which are incorporated herein by reference.

It should be understood by those skilled in the art that various modifications, combinations, sub-combinations and alternations may occur depending on design requirements and other factors insofar as they are within the scope of the appended claims or the equivalents thereof.

The invention claimed is:

1. A display unit, comprising:
   a light source section configured to output light;
   a light uniformization section including at least one uniformization optical member, wherein the light uniformization section has a light entrance surface through which the light outputted from the light source section enters and a light output surface through which light is outputted;
   a condenser lens for the light outputted from the light uniformization section to enter; and
   a reflective light valve to be illuminated by light outputted from the condenser lens, wherein
      one of an optical axis of the condenser lens or an inclination angle of the reflective light valve is set such that a light condensing position on a light output surface side of the light uniformization section for return light is different from a light condensing position on the light output surface side of the light uniformization section for the light outputted from the light source section, and
   the return light is the light that is reflected by the reflective light valve and returns to the light output surface of the light uniformization section via the condenser lens.

2. The display unit according to claim 1, further comprising an illumination lens between the light source section and the light uniformization section, wherein a lens apex of the condenser lens is located at a position different from a position on an optical axis defined by a straight line connecting a lens apex of the illumination lens and a normal of the reflective light valve.

3. The display unit according to claim 2, wherein
   the at least one uniformization optical member includes a microlens array that includes a plurality of microlenses,
   the condenser lens is between the light uniformization section and the reflective light valve in an eccentric state with respect to the optical axis, and
   an eccentricity amount of the condenser lens satisfies an expression below:

$$0.5\times(n+0.25)Pa < d < 0.5\times(n+0.75)Pa \quad (1)$$

where d is the eccentricity amount of the condenser lens with respect to the optical axis, Pa is a period of an array pitch of the microlens array, and n is an integer.

4. The display unit according to claim 2, wherein
   the at least one uniformization optical member includes a microlens array,
   the condenser lens includes two or more condenser lenses between the light uniformization section and the reflective light valve in an eccentric state with respect to the optical axis, and
   the reflective light valve is in an eccentric state with respect to the optical axis, and
   an eccentricity amount of a center point of the reflective light valve satisfies an expression below:

$$0.5\times(n+0.25)Pa < dLB < 0.5\times(n+0.75)Pa \quad (2)$$

where dLB is the eccentricity amount of the center point of the reflective light valve with respect to the optical axis, Pa is a period of an array pitch of the microlens array, and n is an integer.

5. The display unit according to claim 1, wherein
   in the light uniformization section, the light entrance surface is eccentric with respect to the light output surface, and
   the light condensing position of the light uniformization section on the light output surface side is located at a position different from a focal position of the condenser lens.

6. The display unit according to claim 1, wherein the light source section includes one of a solid-state light-emitting device or a discharge tube lamp.

7. The display unit according to claim 1, wherein the at least one uniformization optical member includes a microlens array that includes an arrangement of a plurality of microlenses in a grid shape.

8. The display unit according to claim 1, wherein the light condensing position for the return light is configured to be located off the light condensing position for the light outputted from the light source section on the light output surface side of the light uniformization section in one of a horizontal direction, a vertical direction, or a diagonally oblique direction.

9. The display unit according to claim 1, wherein
   the at least one uniformization optical member includes a microlens array that includes a plurality of microlenses,
   the reflective light valve is to be inclined with respect to optical axes of the light uniformization section and the condenser lens, and
   the inclination angle of the reflective light valve satisfies an expression below:

$$(\tfrac{1}{2})\arctan[(n+0.25)Pa/fc] < \theta p < (\tfrac{1}{2})\arctan[(n+0.75)Pa/fc] \quad (A)$$

where θp is the inclination angle of the reflective light valve, fc is a focal length of the condenser lens, Pa is a period of an array pitch of the microlens array, and n is an integer.

10. The display unit according to claim 1, further comprising a projection optical system configured to project a projection image generated by the reflective light valve onto a projection surface.

11. A display unit, comprising:
    a light source section configured to output light;
    a light uniformization section including at least one uniformization optical member, wherein the light uniformization section has a light entrance surface through which the light outputted from the light source section enters and a light output surface through which light is outputted;
    a condenser lens for the light outputted from the light uniformization section to enter; and
    a reflective light valve to be illuminated by light outputted from the condenser lens, wherein a light condensing position on a light output surface side of the light uniformization section for return light is configured to be located off a light condensing position on the light output surface side of the light uniformization section for the light outputted from the light source section in one of a horizontal direction, a vertical direction, or a diagonally oblique direction, and the return light is the light that is reflected by the reflective light valve and returns to the light output surface of the light uniformization section via the condenser lens.

\* \* \* \* \*